No. 858,929. PATENTED JULY 2, 1907.
G. W. VAUGHN.
PLANTER.
APPLICATION FILED FEB. 14, 1907.

3 SHEETS—SHEET 1.

WITNESSES

INVENTOR
George W. Vaughn
BY
ATTORNEYS

No. 858,929. PATENTED JULY 2, 1907.
G. W. VAUGHN.
PLANTER.
APPLICATION FILED FEB. 14, 1907.

3 SHEETS—SHEET 2.

WITNESSES
INVENTOR
George W. Vaughn
BY Munn & Co
ATTORNEYS

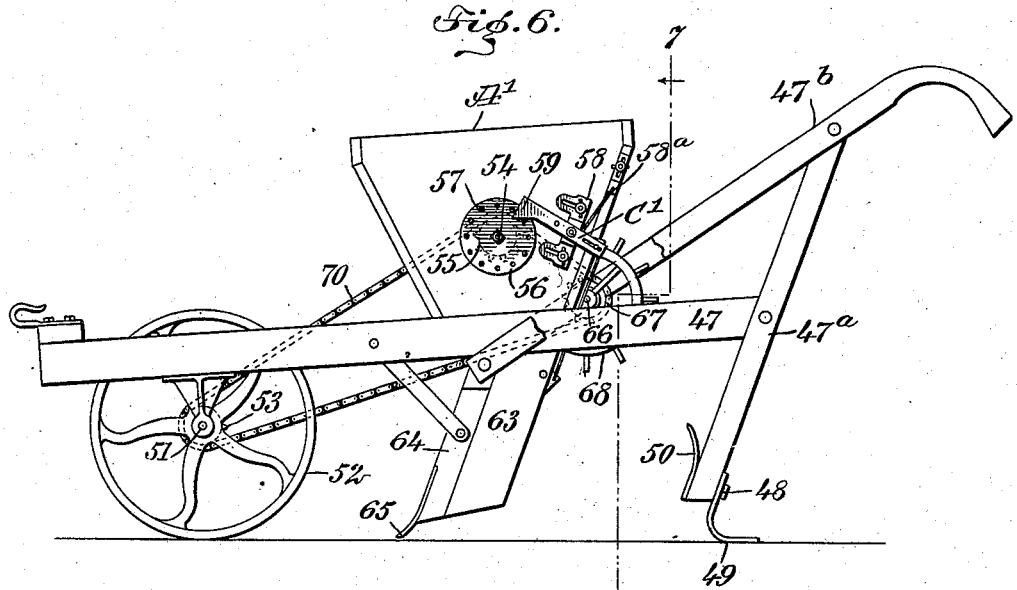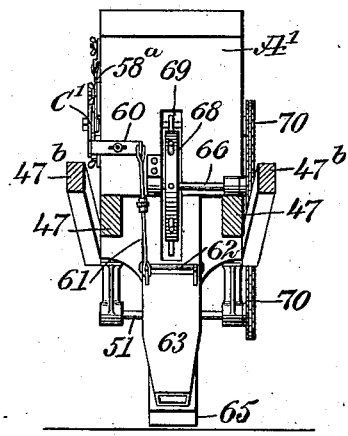

UNITED STATES PATENT OFFICE.

GEORGE WASHINGTON VAUGHN, OF KENEDY, TEXAS.

PLANTER.

No. 858,929.          Specification of Letters Patent.          Patented July 2, 1907.

Application filed February 14, 1907. Serial No. 357,297.

*To all whom it may concern:*

Be it known that I, GEORGE WASHINGTON VAUGHN, a citizen of the United States, and a resident of Kenedy, in the county of Karnes and State of Texas, have invented a new and Improved Planter, of which the following is a full, clear, and exact description.

The purpose of the invention is to provide a simple, durable and economic construction of seed dropping mechanism particularly adapted for planting cotton seed, but which may also be used for droppino seed of kindred nature, and also to so construct the said seed dropping mechanism that it can be used with equally good effect upon a walking planter as upon a wheeled planter, and can be readily and economically installed on either type of machine.

A further purpose of the invention is to so construct the improved seed dropping mechanism that it can be set to drop seed automatically at desired intervals apart as the machine is drawn forward but which will not act as the machine is moved backward, and which can also be set so as not to operate in transit to or from the field.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all figures.

Figure 1:
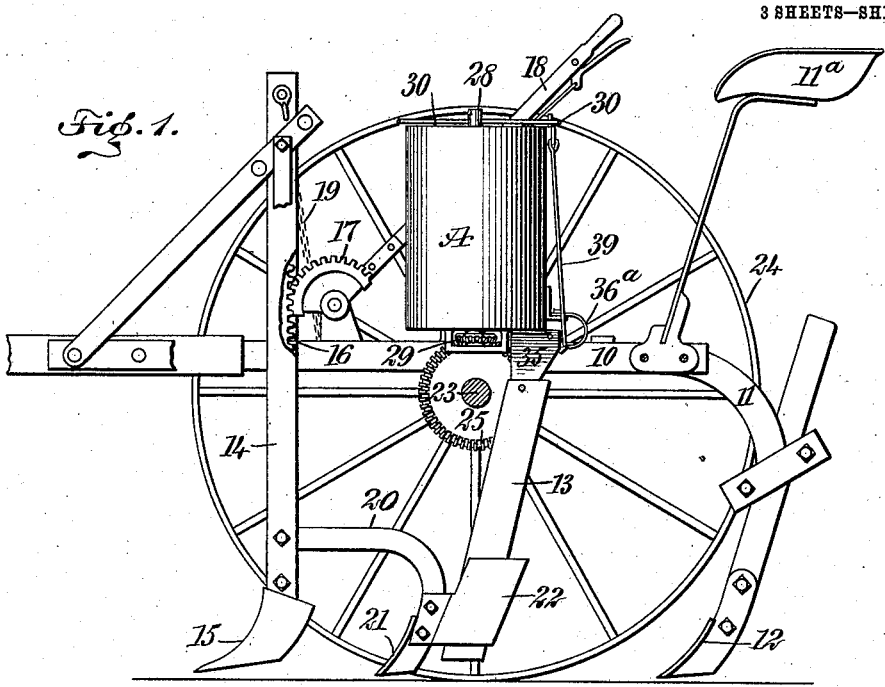
Figure 2:
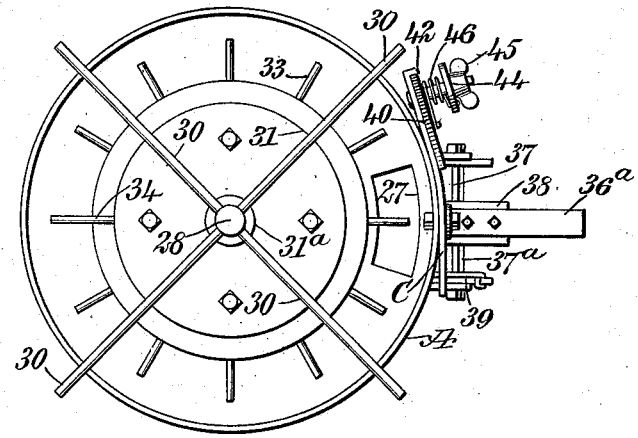
Figure 3:
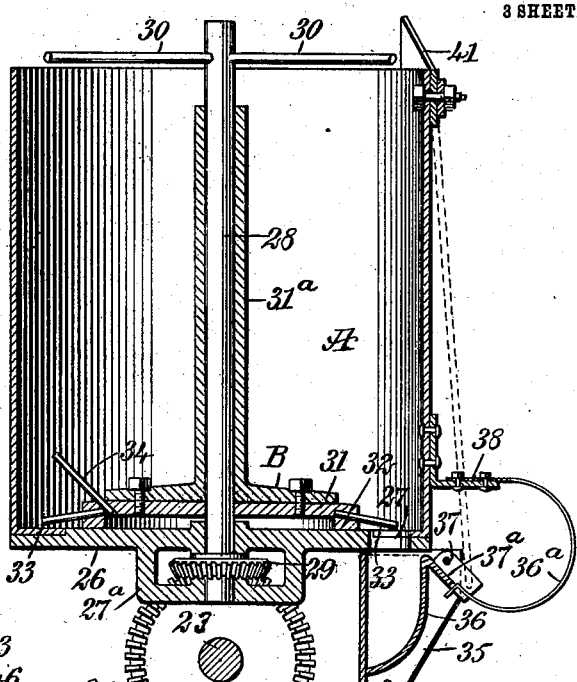
Figure 5:
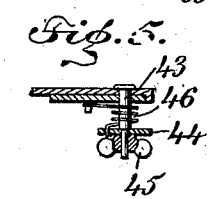
Figure 4:
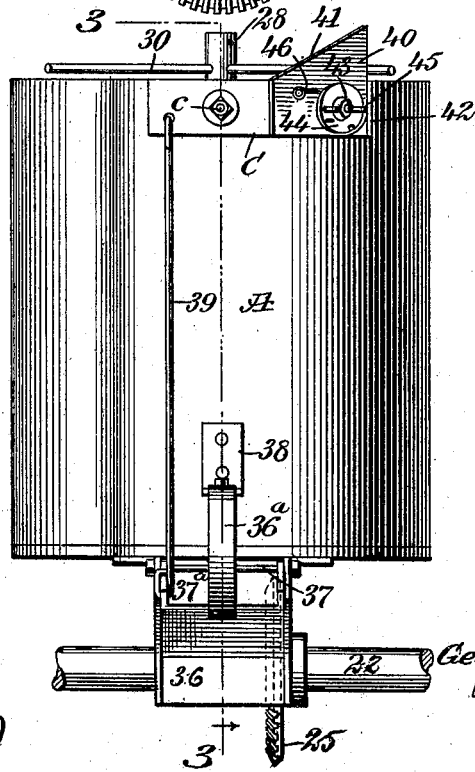

Figure 1 is a vertical section through the frame of a wheeled planter and a side elevation of the applied seed dropping mechanism; Fig. 2 is an enlarged plan view of the seed dropping mechanism removed from the frame of the machine; Fig. 3 is a vertical section through the hopper and the major portion of its accompanying mechanism, some of the parts appearing in elevation; Fig. 4 is a rear elevation of the hopper and accompanying parts; Fig. 5 is a detail sectional view of a portion of the trip lever, its adjustable head and tensioning attachment; Fig. 6 is a side elevation of a walking planter and the seed dropping mechanism attached thereto; and Fig. 7 is a vertical section taken practically on the line 7—7 of Fig. 6.

In Fig. 1 I have illustrated the seed-dropping attachment as applied to a wheeled planter, which planter may be of any approved construction. As shown the frame of the planter consists of parallel center bars 10, suitably connected at the front, and rearwardly-extending downwardly-curved cultivator beams 11, pivotally attached one at each side of the frame, said beams 11 being provided with suitable standards carrying blades 12 at their lower ends. The customary conducting boot 13, through which the seed is dropped to the ground, is also employed, together with a forward plow standard 14, which has vertical adjustment in the frame and is provided with a suitable share 15 at its lower end. The adjustment of this standard 14 is preferably made by producing rack teeth 16 thereon engaged by the teeth of a sector 17 operated by a hand lever 18, which is convenient to the driver's seat 11$^a$.
Usually the forward plow standard 14 is connected by chains 19 with the rearwardly-extending cultivator beams 11, so that the cultivator beams will be raised simultaneously with and proportionately to the forward plow standard. The said plow standard 14 is shown provided with a rearwardly and downwardly-extending shank 20, having a blade 21 at its lower end, located in front of the delivery end of the conducting boot 13 to clear the furrow preparatory to the seed dropping therein, and a guide sleeve 22, slidably mounted on the said boot, is also shown attached to the said beam 20. The aforesaid frame and its attachments are provided with an axle 23, on which the supporting wheels 24 are loosely mounted, and on said axle 23 a gear wheel 25 is secured.

The attachment adapted for use on a riding planter is shown particularly in Figs. 1, 2, 3 and 4, and consists of a hopper A of any desired shape, usually cylindrical, which hopper is located over the axle 23, being suitably supported by the frame of the machine. The bottom 26 of the hopper is provided with an outlet opening 27 adjacent to its side, which outlet opening is located over the conducting boot 13; and at the central portion of said bottom 26 a downwardly-extending stirrup 27$^a$ is usually formed. The said stirrup and the bottom of the hopper A constitute bearings for the lower end of a shaft 28, which shaft extends up through the central portion of the hopper above its upper edge. At the upper end of the said shaft 28 one or more horizontal arms 30 are secured, and said arms as the shaft 28 revolves travel over the upper edge of the hopper as is clearly indicated in Figs. 2, 3 and 4. The arms 30 are usually made removable in order that a number may be employed, since the arms 30 are trip arms and operate mechanism to be hereinafter described which controls the dropping of the seed.

An agitating device B is located within the hopper A, which agitating device consists of a base 31 through which the shaft 28 passes, and an upper sleeve section 31$^a$ that surrounds the shaft 28 and is secured to the base 31 by set screws or their equivalents. The base 31 of the agitating device is by preference provided with an annular marginal flange at its periphery, and pins 33 extend out from the said flange, being given more or less of a downward dip or inclination as is shown in Fig. 3, the said pins, as the agitating device is turned, acting to keep the seed in motion at the outlet opening 27. The base of the said agitating device B is further provided with one or more upwardly and outwardly inclined pins 34, for the purpose of stirring up the seed located above the bottom of the hopper.

The shaft 28 is provided with a bevel gear 29 located within the stirrup 27ª, which bevel gear 29 meshes with the gear 25 on the axle 23, and in this manner the shaft 28 is revolved as the machine travels over the ground.

A chute 35 is secured to the bottom of the hopper A immediately below the outer opening 27 therein, and the lower end of the chute 35 is made to enter the conducting boot 13 and is attached thereto by rivets or their equivalents. Said chute 35 is provided with a door 36, pivoted at the upper outer portion of the said chute by means of a suitable pin 37; and below said pin 37 the door 36 is provided with a flange 37ª, extending outward at an angle to the body of the door, as shown in Fig. 3; and the door 36 is normally held closed by means of a spring 36ª, preferably a loop spring, one end whereof is attached to the flange 37ª on the door 36, while the opposite end of the spring is secured to the body of the hopper A usually through the medium of an attached bracket 38 as shown in Figs. 3 and 4.

In connection with the door 36 a trip lever C is employed, which is made to conform to the exterior contour of the hopper A, and is located at the upper portion of said hopper in such manner that normally its upper edge is flush with the upper edge of the said hopper as is shown in Figs. 3 and 4. This trip lever C is located at the rear of the hopper, and its pivot pin c is passed through the said lever between its center and one end and into the said hopper.

A link 39 connects the short end of the lever C with an upper side portion of the door 36, and when the longer end of the lever C is pressed downward the said link 39 causes the door 36 to open and permits the seed passed through the outlet opening 27 of the hopper to find its way into the conducting boot 13.

At the longer end of the trip lever C a head plate or head section 40 is pivoted. This head section is provided with an inclined upper edge 41, the inclination being upward from the inner end of the said head as is particularly shown in Fig. 3; and the inclined portion of the lever head 40 extends above the upper edge of said lever and likewise above the upper edge of the hopper A. The head is prevented from moving outward beyond the horizontal position by engagement with a flange 42 formed at the extremity of the longer portion of said lever C, as is best shown in Figs. 2 and 4; but the said lever head 40 is free to move outward in direction of the pivot of the lever when required. The attachment of the head 40 to the lever C is effected through the medium of a bolt 43, passed outward through the lever and its head near the outer or deeper edge of said head, and said pivot bolt, as shown in Fig. 5, is provided with a reduced outer section, forming a shoulder against which shoulder a washer 44 has bearing, held in place by a thumb screw 45, located on the reduced section of the bolt, which section is threaded; and a spring 46 is secured to said washer and is coiled around the pivot bolt between said washer and the head 40 and at its opposite end is secured to the said head. The tension may be increased or lessened relative to the head 40 by tightening or loosening the spring 46, which is accomplished by turning the disk or washer 44 in one or the other direction, the thumb nut 45 having been loosened, and then tightening said nut against said washer.

In the operation of this type of seed-dropping mechanism, when the machine is being drawn ahead the trip arms 30 will engage one after the other with the upper inclined edge 41 of the head 40 on the lever C, thus pressing the longer end of the lever downward and raising its shorter end, which carries upward with it the link 39, and said link thereupon carries the door 36 outward to its open position, placing the spring 36ª under tension, thus permitting the seed to be dropped in the hill or in the furrow. As soon as the arm 30 engaging with the head 40 of the lever C leaves said head, the spring 36ª acts to immediately close the door 36 and restore the lever C to its normal position.

When the machine is backed, the direction of rotation of the shaft 28 is changed, and consequently the trip arms 30 will engage with the head 40 at its outer or wider end, and in so doing will force the head to turn inward and downward, permitting the arms to pass over it without moving the lever C and consequently without operating the door 36. In coming to or going from the field, for example, the pivotal tension device for the head 40 can be loosened and the head carried down to its lower position and secured in such position by the disk or washer 44 and the thumb nut 45.

In Figs. 6 and 7 I have illustrated the adaptation of my improvement to a walking planter. The frame of the planter shown consists of parallel main beams 47, having downwardly and forwardly inclined standards 47ª attached to their rear ends, and bolts 48 are passed through the lower ends of said standards 47ª, a shoe 49 being secured to the rear end of each bolt 48; a tooth 50 is attached to the forward end of each of said bolts, the teeth and the shoes extending in opposite directions. In ordinary use the shoes 49 engage with the ground to simply slide over it, while the teeth 50 extend upward and are inactive. When the teeth 50 are required for cultivating purposes, the shoes 49 are carried upward, which brings the teeth 50 in engagement with the ground. The ordinary handles 47ᵇ are secured to the uprights 47ª and ordinarily to the main beams 47.

A shaft 51 is journaled in hangers secured to the lower portions of the beams 47 at their under edges, and said shaft 51 has secured thereto a supporting wheel 52, adapted to travel on the ground. The shaft 51 is further provided at one of its ends with a sprocket wheel 53. The hopper A' in this case is of the conventional tapering type and is suitably supported between the main beams 47.

A shaft 54 extends through the hopper A' from side to side. At one end of said shaft 54 a sprocket wheel 55 is secured, while at the opposite end of said shaft a controlling wheel 56 is attached to said shaft 54, and said controlling wheel 56 is provided with a series of apertures 57, in any one of which a peg may be placed. Any desired number of pegs may be employed, the number and location of said pegs controlling the time of the dropping of the seed and at what distance apart the seed shall be planted.

A bracket 58 is adjustably secured to the side of the hopper A' at which the controlling wheel 56 is located, the adjustment of said bracket 58 being to and from the controlling wheel 56. On said bracket 58 a trip lever C' is pivoted, provided with a head 59 having a beveled under surface, which head is adapted to enter the spaces between the pegs on the controlling wheel, and to be lifted up by engagement with said pegs as the wheel 56 revolves.

The trip lever C' is adjustably attached to the outer end of an auxiliary and co-acting lever 60, adjustably fulcrumed upon the rear of the seed hopper A' as shown in Fig. 7; and this latter or auxiliary lever 60 is connected by a link 61 with a door 62 located within the boot 63 that receives the seed from said hopper A', the door 62 being normally held closed in any suitable or approved manner. Said door is opened only when the head 59 of the trip lever C' is raised by engagement with a peg on the wheel 56.

A spring 58ª is adjustably attached at one end to the hopper, and is wound around the pivot of the trip lever C' and attached at its opposite end to said lever, in order to hold the head 59 of the trip lever in proper position to be engaged by the pins on the wheel 56 as said wheel revolves. Said spring 58ª, by means of its adjustable connection with the hopper, may be tightened or loosened as occasion may demand.

A standard 64 extends down from the frame of the machine in front of the boot 63, and a furrow opener 65 is secured to the lower end of said standard.

A shaft 66 is journaled in suitable bearings at the rear of the hopper A' as shown in Fig. 7, and on said shaft an agitating wheel 68 is secured, which wheel extends partially within the hopper A' through an opening 69 in the back thereof. At one end of the shaft 66 a sprocket wheel 67 is secured, and a chain belt 70 is made to pass over the sprocket wheel 53 on the forward shaft 51 and over the sprocket wheel 55 on the shaft 54 and the sprocket wheel 67 on the shaft 66, so that the belt 70, when the wheel 52 is turned, serves to revolve the controlling wheel 56 together with the agitating wheel 68, the latter wheel being provided with teeth which extend from its periphery.

Having thus described my invention, I claim as new, and desire to secure by Letters Patent,—

1. In a planter, a frame, a hopper carried by said frame, an agitating device extending within the hopper, a chute extending from the outlet opening of the hopper, a spring-controlled door within said chute, a pivoted trip lever provided at one end with a beveled head connected with the door to open the same, a controlling device mounted to rotate and having projections for periodically engaging the beveled head of the said lever, and means for turning said controlling device and the agitating device by the movement of the planter.

2. In a planter, a frame, a hopper carried by said frame, a chute extending from the outlet portion of said hopper, a door within the said chute, a trip lever, a connection between the trip lever and said door to open the same, a controlling device consisting of a rotary member and removable projections from said member, adapted for engagement with said lever, an agitating device mounted to rotate within the said hopper, and means for rotating the agitating device and the controlling device.

3. In a planter, a seed box, a shaft mounted to revolve within said seed box, a chute located below the outlet for the hopper, a spring-controlled door for said chute, held normally closed, a shaft extending up through the hopper, arms at the upper end portion of the said shaft, a trip lever pivoted upon the hopper, a tension-controlled head pivoted upon the lever, which head is adapted for engagement by the arms for the said shaft to operate the said lever, and a link connection between the lever and the said door.

4. In a planter, a seed box, a shaft mounted to revolve within the same, a chute located below the outlet for the hopper, a spring-controlled door for the said chute, held normally closed, a shaft extending up through the hopper, arms at the upper end portion of the said shaft, a trip lever pivoted upon the hopper, a tension-controlled head pivoted upon the lever, which head is adapted for engagement by the arms for the said shaft to operate the said lever, a link connection between the lever and said door, and an agitating device consisting of a base, a sleeve extending from the base and secured to said shaft, and pins radiating from the peripheral portion of the base.

5. In a planter, the combination with a hopper provided with an outlet in its bottom, a chute located below said outlet, a door hinged within the chute, a spring normally holding said door closed, a shaft extending up within the said hopper, and means for turning the said shaft, of a trip lever fulcrumed upon the outer face of the hopper, a tension controlled head pivotally mounted on said lever and provided with an inclined upper edge, means for preventing said head from turning except in one direction, a connection between said lever and said door, and arms extending from the shaft, which arms as the shaft revolves are adapted to engage with the head of the said lever, as described.

6. In a planter, a frame, a hopper carried by the frame, a chute extending from the outlet of the hopper, a door in the chute, a trip lever pivoted intermediate of its ends and provided at one end with a beveled head, a connection between the other end of the trip lever and door, and a rotary member provided with projections engaging the beveled head of the lever.

7. In a planter, a frame, a hopper carried by the frame, a chute extending from the outlet of the hopper, a spring pressed door in the chute, a trip lever mounted on the hopper and having a pivoted and spring pressed head, and rotary arms for engaging said head.

8. In a planter, a hopper, a chute extending from the outlet of the hopper, a door in the chute, a lever pivoted to the hopper and having a flange at one end, a head, a bolt having its outer end reduced to form a shoulder and screw threaded, said bolt passing through the lever and head, pivoting the latter to the former, a washer abutting against the shoulder of the bolt, a thumb nut on the bolt, a spring secured to the head and washer, a connection between the lever and door, and means for engaging the head to operate the lever.

In testimony whereof I have signed my name to this specification in the presence of two subscribing witnesses.

GEORGE WASHINGTON VAUGHN.

Witnesses:
    CHAS. J. ECKHARDT,
    E. G. SCHIWEZ.